(12) United States Patent
Nasuto et al.

(10) Patent No.: US 8,726,243 B2
(45) Date of Patent: May 13, 2014

(54) METHOD AND SYSTEM FOR AUTOMATICALLY TESTING PERFORMANCE OF APPLICATIONS RUN IN A DISTRIBUTED PROCESSING STRUCTURE AND CORRESPONDING COMPUTER PROGRAM PRODUCT

(75) Inventors: Antonio Nasuto, Turin (IT); Danilo Gotta, Turin (IT)

(73) Assignee: Telecom Italia S.p.A., Milan (IT)

( * ) Notice: Subject to any disclaimer, the term of this patent is extended or adjusted under 35 U.S.C. 154(b) by 1159 days.

(21) Appl. No.: 11/992,520

(22) PCT Filed: Sep. 30, 2005

(86) PCT No.: PCT/EP2005/010563
§ 371 (c)(1),
(2), (4) Date: Mar. 31, 2009

(87) PCT Pub. No.: WO2007/038953
PCT Pub. Date: Apr. 12, 2007

(65) Prior Publication Data
US 2009/0204795 A1    Aug. 13, 2009

(51) Int. Cl.
*G06F 9/44*       (2006.01)
*G06F 11/34*      (2006.01)
*G06F 11/30*      (2006.01)

(52) U.S. Cl.
CPC ........ *G06F 11/3409* (2013.01); *G06F 11/3404* (2013.01); *G06F 11/3447* (2013.01); *G06F 11/3466* (2013.01); *G06F 11/3006* (2013.01); *G06F 11/3003* (2013.01)
USPC .......................................... 717/127; 717/130

(58) Field of Classification Search
CPC ................. G06F 11/30; G06F 11/34

USPC ................................. 717/124–135
See application file for complete search history.

(56) References Cited

U.S. PATENT DOCUMENTS 6,397,252 B1     5/2002   Sadiq
6,574,605 B1 *   6/2003   Sanders et al. ............... 705/8
(Continued)

FOREIGN PATENT DOCUMENTS

| WO | WO 03/014878 A3 | 2/2003 |
| WO | WO 03/023621 A3 | 3/2003 |
| WO | WO 2005/018249 A1 | 2/2005 |

OTHER PUBLICATIONS

Zinky et al., "Runtime Performance Modeling and Measurement of Adaptive Distributed Object Applications", 2002, Springer-Verlag Berlin Heidelberg, pp. 755-772.*
R. Prodan et al., "ZENTURIO: A Grid Middleware-Based Tool for Experiment Management of Parallel and Distributed Applications," J. Parallel Distrib. Comput., vol. 64, pp. 693-707 (2004).
M. Calzarossa et al., "Medea" A Tool for Workload Characterization of Parallel Systems, IEEE Parallel & Distributed Technology, pp. 72-80 (Winter 1995).

(Continued)

*Primary Examiner* — Ted T Vo
(74) *Attorney, Agent, or Firm* — Finnegan, Henderson, Farabow, Garrett & Dunner, L.L.P.

(57) ABSTRACT

Performance of applications run on a distributed processing structure including a grid of processing units is automatically tested by: running at least one application on the distributed processing structure; loading the application with processing workload to thereby produce processing workload on the distributed processing structure; sensing the operating status of the processing units in the distributed processing structure under the processing workload and producing information signals indicative of such operating status; collecting these information signals; providing a rule engine and selectively modifying, as a function of the rules in the rule engine and the information signals collected, at least one of: the processing workload on the application, and the operating status of the processing units in the grid.

18 Claims, 3 Drawing Sheets

(56) References Cited

U.S. PATENT DOCUMENTS

| | | |
|---|---|---|
| 7,454,427 B2 * | 11/2008 | Jackson .................. 707/10 |
| 2001/0016867 A1 | 8/2001 | Hu et al. |
| 2004/0015978 A1 | 1/2004 | Orii |
| 2005/0065766 A1 | 3/2005 | Creamer et al. |

OTHER PUBLICATIONS

R. Haynes et al., "A Visualization Tool for Analyzing Cluster Performance Data," Proceedings of the 2001 IEEE International Conference on Cluster Computing (Cluster '01), pp. 295-302 (2002).

* cited by examiner

Fig_1

Fig_3

Fig_2

Fig. 4

METHOD AND SYSTEM FOR AUTOMATICALLY TESTING PERFORMANCE OF APPLICATIONS RUN IN A DISTRIBUTED PROCESSING STRUCTURE AND CORRESPONDING COMPUTER PROGRAM PRODUCT

CROSS REFERENCE TO RELATED APPLICATION

This application is a national phase application based on PCT/EP2005/010563, filed Sep. 30, 2005, the content of which is incorporated herein by reference.

1. Field of the Invention

The invention relates to techniques for automatically testing distributed component-based applications/systems.

The invention was developed with specific attention paid to its possible use in connection with so-called grid computing systems.

2. Description of the Related Art

Grid computing has undergone a number of significant changes in a relatively short time-frame. Supporting grid middleware has expanded significantly from simple batch processing front-ends to fully distributed components with complex scheduling, reservation and information sharing facilities.

Component-based systems typically require workflow descriptions that reflect both organisational and technical boundaries. Applications may span multiple administrative domains in order to obtain specific data or utilise specific processing capabilities. Likewise, applications may select components from a particular domain to increase throughput or reduce execution costs.

In a grid context, for example, an application may have a limited choice in terms of data acquisition (possibly requiring a particular type of instrumentation), but an extended scope in terms of data post-processing (which requires a cluster of commodity processors). A further level of decomposition may exist within the organisation or domain, where individual task atoms (tasks are the basic building blocks of an application in a grid workflow) are assembled to provide overall service.

In this type of systems a significant role is played by the allocation of the various distributed resources to the various workflows to the executed. This must occur in a way that guarantees possible policies in terms of quality of service (QoS) and/or possible indicators of the quality of service (Service Level Agreement or SLA). Exemplary of these are e.g. an established time (for instance, up to five seconds) for executing a certain type of workflow or a certain class of workflows or a mechanism for partitioning hardware resources (for instance CPU resources) to the processes/applications in the distributed environment.

WO 03/014878 describes a system for monitoring and evaluating performance of a network-accessible application. The application comprises one or more load servers, each of which is capable of simulating the load imposed upon the application server by one or more clients. The load servers are configured to execute a particular sequence of server requests in order to evaluate operation of the server under the specified load. Various performance metrics associated with the operation of the network and the application server are measured during the testing of the server, and these metrics are stored for later access by an analysis module. The analysis module identifies those portions of the test data which are statistically significant and groups these significant parameters to suggest possible relationships between the conditions of the load test and the observed performance results.

WO-A-03/023621 describes a network-based load testing system. Specifically, the system provides various functions for managing and conducting load tests on target server systems remotely using a web browser. The system supports the ability to have multiple, concurrent load testing projects that share processing resources. In one embodiment, the system includes host computers ("hosts") that reside in one or more geographic locations. Through an administration website, administrators allocate specific hosts to specific load testing "projects", and specify how each host may be used, e.g. as a load generator or as an analyser. An administrator may also assign users to specific projects, and otherwise control the access rights of each user of the system. Through a user website, testers reserve hosts within their respective projects for conducting load tests, and create, run and analyse the results of such load test. The system application logic preferably includes executable components or modules that dynamically allocate host to load test runs in accordance with reservations made via the user website. The data related to each project (scripts, load tests, test results, and so on) are stored in a repository, and are preferably maintained private to members of that project. The preferred system also includes functionality for blocking attempts to load unauthorised test targets.

Additionally, US-A-2005/0065766 describes a testing method for testing applications within a grid environment using ghost agents. The method includes the step of identifying multiple hosts located within multiple grids of a grid environment, wherein each host is a software object. A ghost agent can be associated with each identified host. Actions in the host can be replicated within each ghost agent. Data relating to the replicated actions can be recorded. Test input can be generated from the recorded data. Tests can be conducted within the grid environment using the test input.

OBJECT AND SUMMARY OF THE INVENTION

In general terms, the Applicant has perceived the need for specific methods and tools for automatically and properly testing distributed systems including a high number of components (such as servers) and capable of self-adapting workload distribution as a function of quality of service and/or business requirements.

The prior art arrangements described in the foregoing fail to provide a truly satisfactory response to such a need in that i.a. they do not provide for the possibility of verifying, particularly in an automated way:

performance of an application/system based on distributed components involving a high number of hardware resources;

the adaptive mechanisms of such an application/system; and performance of a distributed-component application/system, for example, involving the execution of workflows.

The need therefore exists for arrangements that may permit to automatically testing the performance capability of an application based on distributed components and, in particular, specifically testing the performance capability of a distributed-component application involving the execution of workflows. Verifying the performance capability of an application involves a set of test procedures adapted to put under "stress" the application in terms of activities performed in a time unit with the purpose of singling out functional "bugs" or more simply the operating limit of the hardware and software resources that support the application. Another target of such a verification of the performance capability of an application may be related to verifying the time required by the application to perform the activities requested when the application is exposed to a high number of requests. For instance, verifying the performance capability of data base involves determining the maximum number of transactions that can be performed within a given time interval, while also ascertaining how execution times of the transaction vary as a function of the load on the data base.

Verifying the performance capability of an application based on distributed components involving a high number of hardware resources has an additional degree of complexity related to the need of verifying—in the presence of high workloads:

those mechanisms by means of which the application manages the workload distribution over the hardware resources (servers) that support it;

the fault tolerance capability or the capability of the application to continue providing its full functionalities even in the presence of a breakdown in one or more hardware resources over which the application is executed;

the capability of "scaling" over such a high number of servers.

It will be appreciated that a "high" number of components is herein meant to indicate a number in excess of ten. Additionally, as used herein, the term "workflow" is intended to designate a sequence of several activities, which are represented by a sequence of closely related components or jobs that are executed in a pre-defined order on local grid resources.

The object of the present invention is to provide a valuable response to the needs outlined in the foregoing.

According to the present invention, such an object is achieved by means of a method having the features set forth in the claims that follow. The invention also relates to a corresponding system and a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion. The claims are an integral part of the disclosure of the invention provided herein.

A preferred embodiment of the arrangement described herein is thus a method for automatically testing performance of applications run on a distributed processing structure including a grid of processing units, wherein the method includes the steps of:

running at least one application on said distributed processing structure;

loading said application with a processing workload to thereby produce processing workload on said distributed processing structure;

sensing the operating status of said processing units in said distributed processing structure under said processing workload and producing information signals indicative of said operating status;

collecting said information signals, and providing a rule engine and selectively modifying, as a function of the rules in said rule engine and said information signals collected, at least one of:

said processing workload on said application, and the operating status of at least one processing unit in said grid.

Briefly, the testing arrangement described herein is adapted to exploit a centralized unit for co-operating with a plurality of distributed agents, each associated with a remote server on which the application is executed.

A particularly preferred embodiment of the arrangement described herein involves the following steps:

generating, via the centralised unit, an initial application load to the distributed-component application under test;

collecting via distributed agents information concerning performance and operating status of the remote servers;

processing the data (measurements) collected to generate a new application load by the centralised unit on the basis of the results of processing the performance information collected via the distributed agents; and repeating the process described in the foregoing until the test is completed.

Advantageously, each distributed agent is a software object adapted to collect performance information as to how each distributed component or remote server are affected by the application load generated by the centralised unit. This performance information is then processed by the centralised unit in order to establish how the load on the distributed-component application under test can be changed in order to reach a final operating condition as set by the test process being executed (for instance, how the load generated can be modified to reach 90% exploitation of the hardware resources provided by the remote servers on which the application is run).

In particularly preferred embodiment, the distributed agents are designed in order to collect performance information and to put into practise certain actions (as defined by the centralised unit on the basis of the test procedure) on the associated remote servers. These actions may include, for instance, turning a server off, or generating a fictitious load in order to saturate a specific hardware resource such as RAM or CPU. In that way, the verification process of certain functionalities provided by the application (for instance fault tolerance functionality or adaptive functionalities) can be greatly facilitated.

BRIEF DESCRIPTION OF THE ANNEXED DRAWINGS

The invention will now be described, by way of example only, with the reference to the annexed figures of drawing, wherein.

DETAILED DESCRIPTION OF PREFERRED EMBODIMENTS OF THE INVENTION

Figure 1:
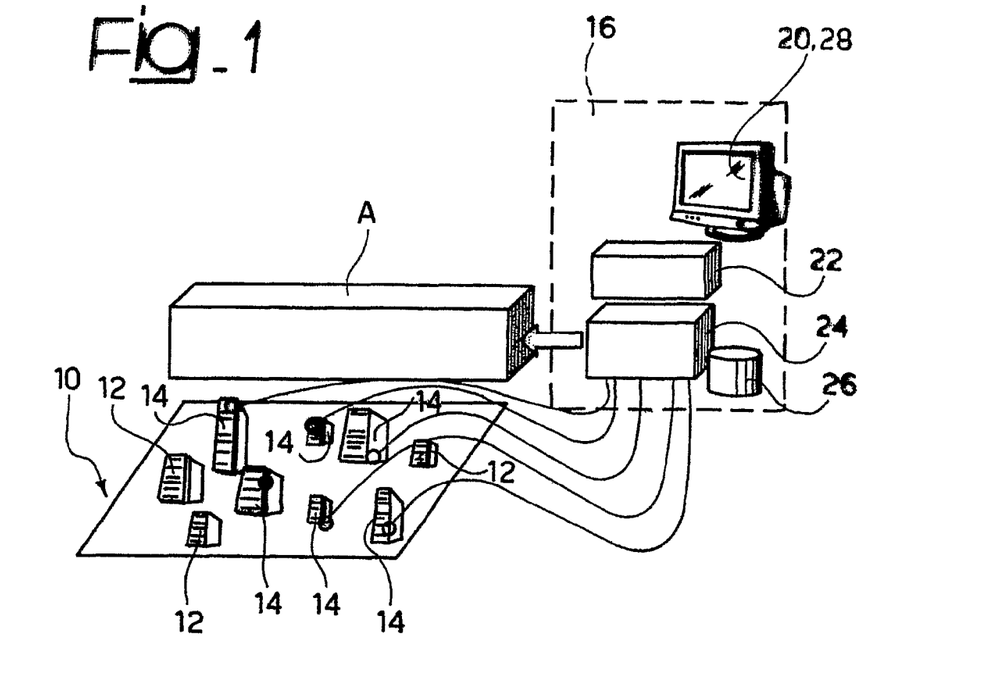
FIG. 1 is a functional block diagram of a system for testing a distributed-component application.

In brief, the arrangement shown in FIG. 1 includes a distributed processing structure 10 including a "grid" of processing units 12 exemplified by servers or the like.

As indicated in the foregoing, it will be assumed that the grid arrangement 10 includes a "high" number of units/servers 12, "high" typically meaning a number in excess of ten. To each server 12 there is associated a respective agent 14 (a so-called "worker" agent). The worker agents generate information signals that are generally representative of the operating status of the associated server 12.

As used herein, "operating status" shall include any set of parameters that properly identify (for the purposes of the testing performed) the current conditions of operation of a given apparatus. Exemplary of parameters adapted in such as set are e.g. the CPU utilisation, the memory utilisation, the number of processes running on the apparatus, the number of I/O operations performed (possibly broken down as a function of the devices involved) and so on.

As will be detailed in the following, each agent 14 is also preferably configured in a way to constitute an actuator able to perform certain actions on the associated server 12: by way of example, such an action may be represented by selectively turning the associated server 12 on and off.

In that respect, it will be appreciated that the grid 10 will generally include a set of "candidate" units/servers 12 properly configured to be activated in order to play an active role (for instance a part of processing or computing a task) within the grid. The grid 10 is adapted to run one or more applications ("grid" applications) schematically indicated by A.

One or more processing loads, including test loads as better described in the following, can applied to those applications. This occurs in a manner known per se, thereby making it unnecessary to provide a more detailed description herein.

The signals produced by the worker agents 14 come down to grid tester unit 16 including a number of components.

In a currently preferred embodiment, these components include a configuration console 20, a policy controller module 22, a manager loader module 24, a database 26, and a reporting console 28. While being discussed separately for the sake of clarity, the configuration console 20 and reporting console 28 can be incorporated to a single user interface typically in the form of GUI (Graphic User Interface).

The configuration console 20 is the graphic environment by means of which a user can select and/or define a test procedure to be executed.

The policy controller module 22 is the component containing the system intelligence concerning the way of executing the test procedure selected. The policy controller module 22 also supervises execution of any such test procedure. Specifically, the policy controller module 22 has an associated policy library (not shown in the drawing) preferably in the form of a separate library for each policy to be run. Each policy as stored defines a sequence of commands and the loads to be applied to the application at certain time intervals (Base Intervals BI).

Specifically, the policy controller module 22 communicates to the loader manager module 24 these policies at such base intervals BI as set by the user via the configuration console 20.

The manager loader module 24 is the component in charge of executing the sequence of commands as received by the policy controller module 22. Specifically, the manager loader module 24 generates, as a function of the commands received by the policy controller module 22, an application load in the form of a workload towards the distributed-component application to be tested. In the meantime, the manager loader module 24 manages the distributed agents 14 in terms of performance information to be collected with the remote servers 12 associated therewith.

In a preferred embodiment of the arrangement described herein, the manager loader 24 also specifies the actions that the distributed agents 14 perform on the remote servers 12 to which they are associated.

At each base interval BI, the load to be generated towards the distributed-component application is established dynamically by the policy controller module 22 on the basis of the performance information as received. The manager loader module 24 establishes the load to be generated in a dynamic way until a final operating condition is reached for distributed-component application to be tested associated with the test procedure selected.

Essentially, the manager loader module 24 implements a rule engine adapted to selectively modify (via the agents 14) as a function of the rules in the rule engine and the information signals collected via the agents 14, at least one of:
the processing workload on said application, and
the operating status of the processing units 12 in the grid structure.

The database 26 is the component where the performance information collected by the distributed agents 14 during the execution of the test procedures are collected. The database 26 also stores configuration information of the testing system such as e.g. the base interval BI, how the data collected must be archived, how the distributed application must be interfaced and so on.

The reporting console 28 is the graphic environment that enables the user to analyse the results of the test procedures. These results may include the application load to which the distributed-component application is to be subjected in such a way that this application operates in the final operating configuration associated with the test procedure as executed. Additional information typically presented to the user includes i.a. the maximum throughput achievable, the workflow execution times, the "scalability" curve (as better detailed in the following).

Figure 2:
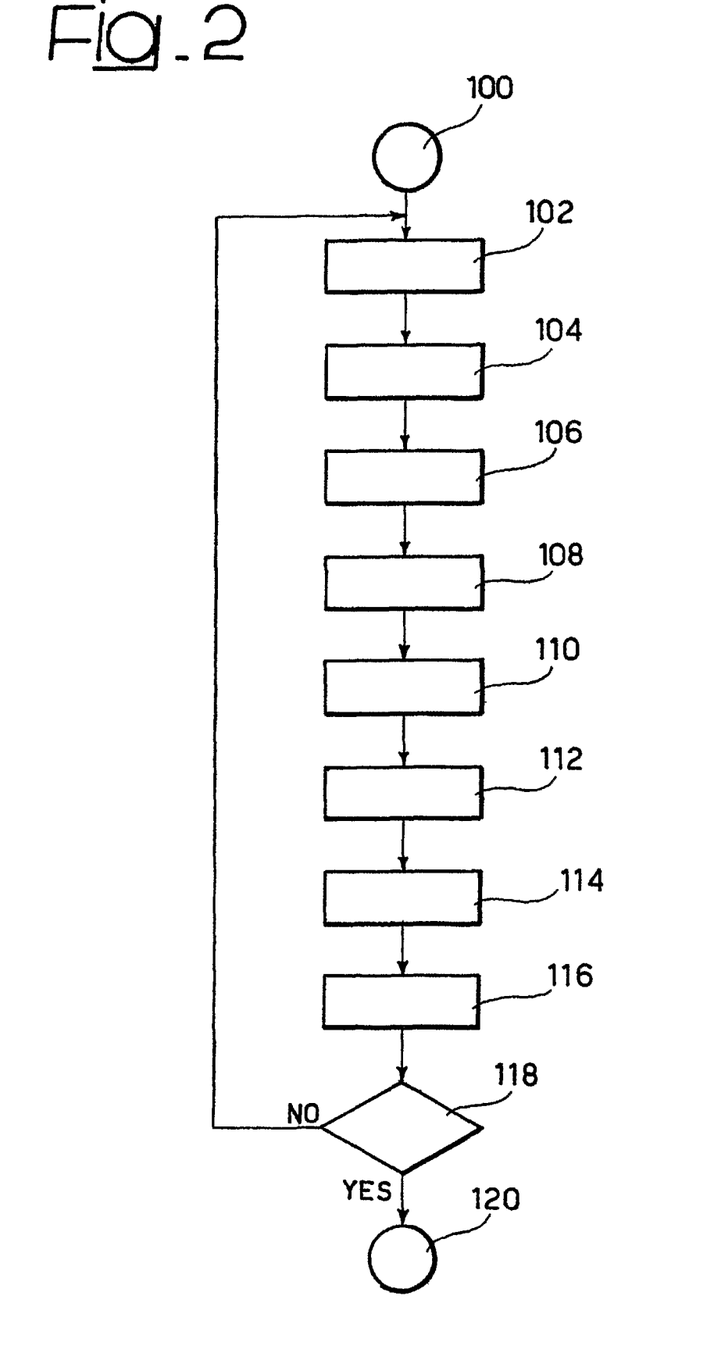
FIG. 2 is a flow-chart representative of a possible implementation of the method described herein.

By referring now to the flow chart of FIG. 2 operation of the testing arrangement just described involves, after a START step 100, an initial step 102 wherein the user selects, via the configuration console 20, a test procedure to be executed. As a function of the test procedure selected by the user, in a step 104, the policy controller module 22 selects one of the policies included in the libraries by identifying the policy associated with the test procedure selected by the user.

In a step 106, the policy controller module 22 communicates to the manager loader module 26 the sequence of commands that comprises the policy selected.

In general terms, for each policy selected, the policy controller module 22 sends to the manager loader module 24 a sequence of commands including:
the type of workload to be applied to the distributed-component application under test. When the distributed components operate on the basis of workflows, the load to be generated is represented by the number of workflows that the distributed components must execute and the input parameters associated with the single workflows (for instance, where a workflow involves executing a simple loop, the input parameter may be represented by the number of iterations to execute);
the type of performance information the distributed agents 14 must collect.

In a preferred embodiment, the command sequence sent by the policy controller module 22 to the manager loader module 24 may also include a series of actions that the distributed agents 14 may execute on the remote servers 12 associated therewith. This may include e.g. turning the associated server on or off, generating a fictitious load to saturate hardware resources on specific hosts and the like.

On the basis of the sequence of commands received from the policy controller module 22, the manager loader module 24 generates, in a step 108, a load toward the distributed-component application under test. Simultaneously, in a step 110, it also sends towards the distributed agents 14 the performance information to be collected in respect of the remote server associated therewith, and, if present, the sequence of actions that each agent 14 can execute on the respective server 12.

As indicated in the foregoing, each agent 14 can be seen as a sort of a probe adapted to collect performance information concerning the remote server associated therewith and/or as actuators adapted to perform "scripts" or actions on the associated remote servers.

For instance, the distributed agents 14 may be arranged to:
produce significant consumption of hardware resources on the respective remote servers independently of the activity performed by the distributed application on the same server 12;
enabling or disabling the distributed components of the distributed-component application under test; and
collecting performance information concerning, for instance, the hardware consumption (for instance in terms of CPU, memory available, and so on) on the respective remote servers or the number of workflows that have been correctly finalised.

At the end of each base interval BI, in a step 112, the manager loader module 24 stores in the database 26 the performance information as collected by the distributed agents 14. In turn, in a step 114, the policy controller module 22 collects this information from the database 26, processes it and—on the basis of the results obtained—defines, in a step 116, a new application load that the manager loader 24 will generate towards the distributed-component application under test during the subsequent base interval BI.

In a step 118 a check is made as to whether the final operating condition associated with the test procedure being executed has been reached or not.

In the negative, the sequence of steps 102 to 116 highlighted in the foregoing is repeated. Alternatively (positive outcome of the step 118), the test procedure is held to be terminated and system comes to a stop in a step 120.

The test arrangement described in the foregoing is configured to:
manage in an integrated and centralised way a plurality of tests of performance capability of a distributed-component application including a high number of remote servers;
define new test methodologies associated, for instance, to a point-like check of the services provided by the distributed-component application. In practice, the system administrator calculates new policies without modifying the applications (namely the associated code), by simply adding a new policy to the policy library managed by the policy manager module 22.

The performance capacity tests executed by the test arrangement just described can be partitioned in two basic categories, namely: basic checks and adaptive functionality check.

The basic verifications/checks may include, for instance:
scalability, namely the capability for the distributed-component application to ensure an increase in throughput, namely the number of activities (workflows) performed in a time unit with an increase of the number of the remote servers 12 on which the application is run;
degree of parallelism, namely the capacity for the components of the distributed application to parallelise execution of the activities to be performed;
throughput sensitivity, namely the capacity for the distributed-component application to ensure a given throughput level in the presence of application loads of different types. In fact, throughput depends on the type of workflows that are executed in addition to the inputs thereto. Consequently, varying the type of workflow(s) may mean significantly changing the results obtained via scalability verification;
the presence of possible "bottlenecks", namely checking that the distributed-component application does not include components likely to singularly affect performance of the entire application in terms of maximum throughput to be achieved;
the absence of any "domino effect", namely the capability for the distributed-component application to ensure the availability of its functionalities irrespective of whether one or more distributed components become unavailable;
stability, namely controlling the capacity of the distributed-component application to operate in a stable manner, without degenerative effects in terms of software and performance in the presence of a significant load on the application for a very long time (for instance several hours);
stress, namely the capacity for the distributed-component application to support a peak in processing load notably higher (for instance ten times higher) in comparison to the load for which the application was dimensioned.

Verification of the adaptive functionalities may include for instance verifications of:
adaptability, namely the capability for a distributed-component application to process with different priorities workflows of different types in order to ensure given business targets. For instance, the user may define business targets of the following types: an A-type workflow to be processed and completed in three minutes, while another, B-type workflow must be executed within one hour. Starting from these targets, the distributed application must be in a position to manage processing of workflows in order to ensure that the targets are met, for instance by giving priority in execution to those workflows that have stricter business targets in comparison to those workflows that have less stringent targets to meet;
adaptability in the presence of external perturbations, namely those set of verifications, performed on the distributed-component application with the purpose of controlling those functionalities that execute workflows with different priorities depending on the business levels associated therewith. In the case where the hardware resources of the remote servers on which the distributed-component application is run are appreciably used also by application components external to the application under test. This verification enables one to understand how the distributed-component application under test behaves when another application absorbs processing resources thereby reducing the hardware resources of the remote servers on which the distributed-component application under test is run;
workflow distribution policies, namely the capability for the distributed-component application to govern distribution of workflows over the remote servers over which it is run, for instance by using geographic criteria or on the basis of load-balancing principles;
resource occupation policies, namely the capacity for the distributed-component application to ensure that the hardware resources on the remote servers 12 are occupied on the basis of pre-defined rules. Specifically, limits can be set by the arrangement on the possibility for the application to exploit the hardware resources of the remote servers 12 in order to leave empty space for other application (for instance by establishing that the application should not use more than 30% of the server CPU resources).

In the following a detailed description is provided of the test procedures to implement the verification steps described in the foregoing.

In order to facilitate understanding of those test procedures as associated with an individual application, this will be instantiated by referring to an application based on the concept of distributed components that are "intelligent", namely capable of executing workflows: these are essentially sequences of steps described at the level of flow charts (such as, for instance, the application described in WO-A-05/0182249—hereinafter referred to as "WANTS"). It will be appreciated however, that what is described herein can be generalised to any type of distributed-component application.

In that respect it may worth recalling that the workflow of a WANTS application includes a list of activities of procedures or steps that are executed by one or more of the intelligent components comprising the application itself. Therefore, in general terms, activating a workflow amounts to requesting specific service from the WANTS application, for instance the activation of a given ADSL service. Furthermore, applying an application workload on a WANTS application means forwarding towards the application, for each base interval BI, a list of different workflow types to be executed together with the number of times they will have to be executed.

Specifically, an application such as WANTS manages a repository with all the workflows that can be executed, each workflow being identified by a given name. In that way, the manager loader module 24 will simply have to recall, sequentially, the workflows to be executed by the WANTS application, following the timing and the volumes provided for by the test procedures selected. Interfacing with the WANTS application takes place via a software module defined an executor, which manages the communication between the WANTS application and the manager loader 24.

Scalability

Scalability of a WANT application essentially means the capability for the application to increase the workflow processing throughput when the number of remote servers used for execution of these workflows increases.

The purpose of this check is to trace the relationship of the WANTS application throughput with respect to the increase in the number in the remote servers 12 (namely the hardware resources) on which the application is run, while also identifying any asymptotical behaviour in terms of maximum throughput to be achieved.

Figure 3:
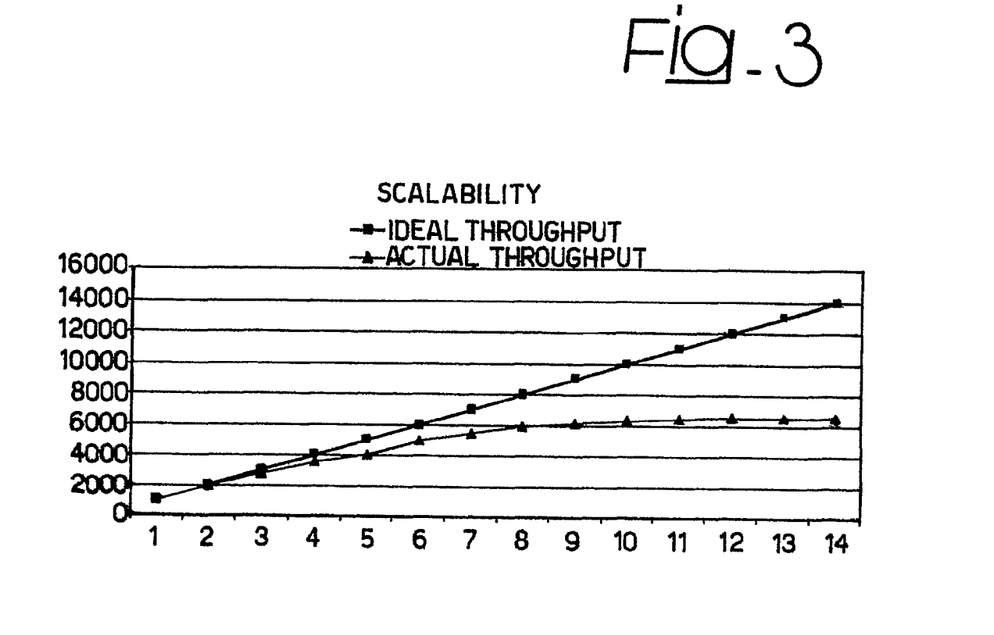
FIGS. 3 and 4 are representative of certain results that may be achieved by using the arrangement described herein

A possible outcome of such verification is a graph as shown in FIG. 3, wherein the maximum throughput achieved (ordinate scale) is shown for each value of the number (abscissa scale) of remote servers 12 onto which the distributed-component application is run.

Comparison of the "ideal" throughput with the "actual" throughput as illustrated comparatively in FIG. 3 shows that adding a new remote server 12 only notionally corresponds to an increase in throughput. As the number of remote servers 12 increases, the application may no longer be capable of providing a sensible increase in terms of throughput.

This may be due to the presence of "bottlenecks" in the application itself or to the communication among the distributed components installed on the various servers 12 becoming the primary activity for correct operation of the application. In practice, it may happen that, with a high number of servers 12, the amount of information to be exchanged among the distributed components in order to permit correct operation of the whole application increases to such an extent that the server resources are mainly dedicated to managing this function, rather than to workflow processing.

In general terms, the test procedure associated with this verification involves a series of measurements whose purpose is to identify the maximum throughput to be achieved with an increasing number of the remote servers made available to the application. Adding one server "run-time" may simply involve starting the application (e.g. WANTS) component residing on the server in question via the distributed agent 14 of the testing system associated with the server in question.

In detail (see again the flowchart of FIG. 2) the test procedure involves, as a first step, activating an intelligent component of the application on the respective remote server 12. Activation takes place via the distributed agent 14 installed on the server 12 in question.

Subsequently a workload is generated represented by an initial number of workflows to be executed by the intelligent component activated. The generation of the workload takes place by the manager loader module 24.

As a further step, the distributed agents 14 collect the information corresponding to measurement of the throughput reached after time corresponding to a pre-set base interval BI.

Finally a new workload is generated to be executed by the intelligent component activated during the base interval BI following the one previously considered. The new workload is generated by the manager loader module 24 by increasing the initial number of workflows to be executed by the intelligent component. The quantity by which the number of workflows is increased is calculated by the policy controller module 22 on the basis of the throughput measurement collected by the distributed agent 14.

Subsequently, the distributed agents 14 collect the measurement information related to the new throughput and checks whether the value obtained is higher in comparison to the one measured during the base interval BI considered previously.

If the throughput is increased significantly, the systems loops back to the step of generating a new workload. Alternatively, the system proceeds by activating a new intelligent component on a different remote server 12 and the cycle just described is repeated starting from the step of increasing the workload defined previously.

The test procedure here described is discontinued when activating new intelligent components on different remotes servers 12 no longer leads to an increase in throughput or when all the remote servers 12 available have been used.

Degree of Parallelism

The purpose of this verification is to identify the capacity for the WANTS application to manage jointly two or more workflows, and specifically to establish the maximum number of workflows that the application may manage simultaneously.

Checking this functionality may be performed by using "dummy" workflows, namely workflows that do not perform any specific operation other than waiting for a given time interval.

In general, the test procedure associated with this kind of verification initially provides for the generation—as a rapid sequence—of two or more "dummy" workflows that exhibit the characteristic of having high waiting time (for instance 30 seconds) without consuming appreciable resources while subsequently verifying the times required for completing this type of workflow. In fact, if the WANTS application is in condition to process all the workflows in parallel, it will happen that all the "dummy" workflows launched at the same instant are completed around the waiting time (for instance 30 seconds). Conversely, if the number of "dummy" workflows generated is higher than the degree of parallelism allowed by the WANTS application, one will notice that for the "exceeding" workflows the completing time is multiple than the expected time, for instance 30 seconds. The reason for this lies in that the exceeding workflows are queued and thus will have to wait the time corresponding of the previous workflow before being in term executed.

In detail, the test procedure may involve the following steps:
- simultaneously generating towards the WANTS application a load represented by at least two "dummy" workflows with a waiting time equal to e.g. 30 seconds,
- waiting for completion of these workflows while verifying, via the load manager module 24, that for both the "dummy" workflows generated the completing time is in the proximity of 30 seconds;
- generating a new workload towards the WANTS application by increasing by one unit the number of "dummy" workflows generated; and
- checking that all the "dummy" workflows generated are completed within 30 seconds and, in the positive, looping back to the previous step, otherwise concluding the procedure.

The degree of parallelism of the WANTS application is given the last value (minus one) of the "dummy" workflows that WANTS application is in condition to complete in the same time period.

Workflow Distribution Policies

As indicated, this verification essentially involves verifying how the WANTS application distributes processing of the workflows over the remote servers.

The workflow distribution policy may follow different rules, for instance:
- geographical: the workflows that execute activities related to certain domain are executed only by the intelligent components belonging to that domain; or the workflows that must execute activities e.g. towards a given apparatus in the network, are executed by a single intelligent component devoted to managing that apparatus;
- balancing: the workflows are distributed evenly over all the intelligent components, e.g. to ensure a consumption of the hardware resources that is identical for all the servers over which the application is executed.

The test procedure associated with this type of verification is again based on the use of "dummy" workflows. Preferably, these "dummy" workflows are again of the type that does not require specific operations to be performed, with the only requirement that they should follow specific rules in order to ensure their trackability. Workflow trackability may be guaranteed e.g. by:
- causing the workflows to be executed to consume a significant amount of CPU resources (for instance by executing an instruction loop);
- causing the workflows to contain information items such as to permit the WANTS application to ensure distribution thereof (this requirement is not necessary in the case distribution takes place in a balanced mode).

Specifically, the test procedure associated to this verification provides for the generation of a plurality of workflows (which represent the workload) all intended for instance to be executed on remote servers belonging to a given geographical area or a given network operators. Controlling that the WANTS application is in compliance with the geographical distribution rules take place by measuring that consumption of hardware resources increases only for the remote servers belonging to that geographical area. Again, measurements are collected via the distributed agents 14 of the testing system associated to those servers.

Compliance with Resource Occupation Policies

This verification involves checking that the WANTS application may ensure the hardware resources on remote servers 12 to be in compliance with the rules set by the administrator of the WANTS application as regards the maximum resource consumption. This function is useful when one has to do with remote servers shared by the WANTS application under test with different applications, so that the need exist of ensuring that all application are allotted a minimum amount of hardware resources.

Again, this functionality is checked by using "dummy" workflows whose execution generates workload for the hardware component of the remote servers that are shared, for instance by producing a significant consumption of CPU resources.

The test procedure generally provides for generating, during each base interval BI, an increasing number of "dummy" workflows (which represent the workload) to subsequently check, via the distributed agents 14 in the testing system, that the limit threshold set by the administrator of the application is not exceeded, for instance by requesting that the exploitation of the CPU resources does not exceed 30%.

Throughput Sensitivity

This corresponds to checking the capacity for the WANTS application to ensure a given throughput in the presence of different types of workflows. This verification is essentially similar to the scalability verification described previously, with the difference that in the place of "dummy" workflows, real workflows are used, mainly those workflows that will be actually used during normal operation of WANTS application.

The object of this verification is to identify those workflows having characteristics such as to jeopardise either the application throughput or scalability thereof.

In that sense, throughput sensitivity verification is performed by executing a plurality of scalability verifications in a number corresponding to the different types of workflows to be used. The area included between the curve representing scalability with a higher throughput (obtained by using a benchmark workflow) and one having a lower throughput represents the throughput sensitive area within which the application is in a position to execute all the workflows considered.

Figure 4:
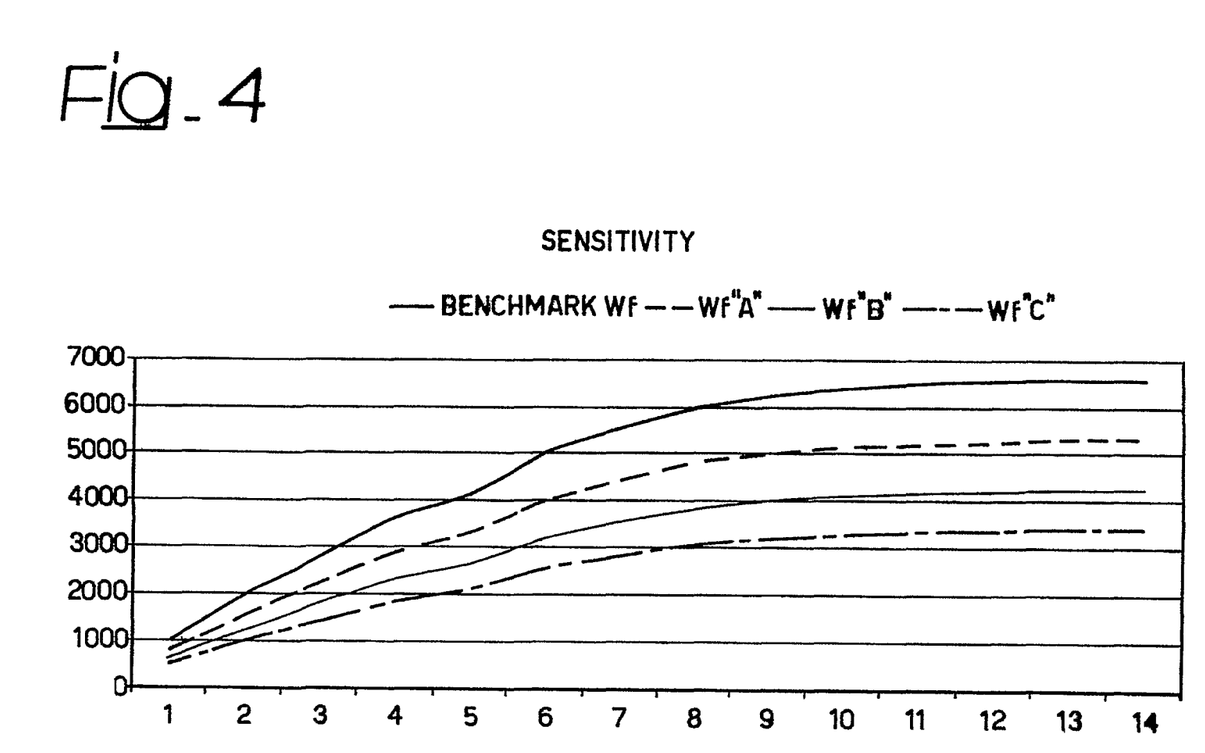

FIG. 4 reproduces by way of example a graph including a "benchmark" curve essentially indicative of how scalability (ordinate scale) varies as a function of the number of servers/units 12 (abscissa scale) with variations in the types of workflow used. The graph considered three real workflows (A, B and C) are considered having corresponding behaviours in terms of throughput. In the example illustrated in FIG. 4, by using the workflow "C" a maximum throughput of 3500 workflows per minute is achieved while by using the "A" workflow throughput in excess of 500 workflows per minute is achieved. The workflow B is exemplary of a performance level intermediary the workflows A and C.

This kind of verification may single out a number of problems, namely:
- minimum and maximum variations in throughout as a function of the workflows used. Evaluating the reasons for these variations makes it possible to identify and improve the criteria for defining workflows in such a way to ensure an optimal execution performance;
- scalability variations: scalability of the application may be compromised due to a high predominance of "dialog"

activities between different remote servers 12 when execution of a workflow is not confined within a single intelligent component and is performed by a plurality of intelligent components installed on a plurality of remote servers.

The test procedures associated with this kind of verification may include the following steps:

- performing a scalability verification by using a reference workflow, for instance a "dummy" workflow that makes it possible to attract maximum limit obtainable by the application in terms of throughput;
- performing a plurality of scalability verifications, each one for a given type of real workflow to be used and subject to testing;
- comparing each scalability curve previously obtained with the scalability curve obtain by using a "dummy" workflow as a reference workflow: for instance, this may involve providing the ratio of the maximum throughput obtained with the real workflow to the maximum throughput obtained with the reference workflow;
- creating an orderly list of the real throughput/best reference workflow ratios. In practice, when a given ratio tends to one, the workflow is in an increased position to achieve the theoretical throughput; conversely, when the ratio is small, namely lower than one, the related workflow will generally provide poor performance. In general terms, the worst of workflows will be one having the lowest ratio.

Checking for Bottlenecks

This check aims at verifying that the application does not involve intelligent components likely to adversely affect the performance of the whole application in terms of maximum throughput to be achieved. The application may include centralisation components likely to limit scalability of the application itself. By verifying scalability, the possible exist of identifying the reasons associated with the application being unable to increase its performance as a result of new servers 12 being added.

Specifically, such reasons may be related to the following situations:

- presence of high inter-exchange of information between the intelligent components which may become predominant in comparison with the activities performed by the whole application, which may represent a limiting factor to the performance increase related to new remote servers 12 being added;
- the presence of centralised components within the application (for instance a component for inputting an implementing workflow distribution) which, as the activities performed by the application increase, tend to saturate the hardware resources available to the remote servers 12 with a consequent slowing-down of the whole application.

The test procedure associated with this verification is essentially similar to the test procedure related to scalability. A basic difference lies in that a workload towards WANTS application must be generated as represented by the combination of real workflows, namely workflows to be actually used during a normal operation at the WANTS application. No "dummy" workflows are used in this case.

Once the scalability test on the basis of a real combination of workflows is completed, the test system provides an orderly list of the remote servers onto which the intelligent components of the application are installed by highlighting those servers 12 that have exhibited the higher amounts of a hardware resource consumption (for instance CPU consumption, memory consumption and so on). The consumption values are provided by the performance measurements performed by the distributed agents 14 of the testing system as stored in the database 26.

The remote servers 12 having the highest positions in the list represent those components that are mostly responsible for throughput limitation.

Domino Effect

With the exception of "single points of failure" (namely failures that may compromise operation of the whole application) this amounts to verifying the capacity for the application to ensure availability of its functionalities irrespective of whether one or more of the intelligent components comprising it may become available. In fact, the characteristics of distributed-component application render such an application particularly exposed to the risk of unavailability of one or more remote components.

The purpose of this verification is to create an unstable condition and to verify if and how the application is in position to manage that kind of condition.

In detail, the potential instability conditions which may affect the application can depend, e.g. on:

- the loss of one or more remote servers 12 and the consequent loss in processing capacity; this may give a rise to workflow overhead such as to compromise operation of the whole application;
- the presence of functionalities (designated so-called reliability functionalities) whose purpose is to automatically re-create on other remote servers the functionalities that were lost; this process may result, in conjunction with the need of continuing processing of new requests, a workload overhead such as to generate an overall blocking effect for the whole application;

The test procedure associated with this kind of verification includes the following steps:

- generating a workload towards the WANTS application represented by a significant amount of workflows to be executed: for instance, a volume such as to occupy 50% of the processing power of all the remote servers 12 on which the application is run;
- de-activating one or more intelligent components via the distributed agents 14 of the test system;
- measuring the new throughput value and waiting for stabilisation thereof (namely waiting for the end of the transition regime);
- re-activating the intelligent components that were de-activated previously via the distributed agents 14 of the test system;
- measuring again the throughput, via the distributed agents 14 of the test system, and
- repeating the procedure starting from the de-activation stage by gradually de-activating an always increasing number of intelligent components, at least as long as all these—but one—have been de-activated.

The test procedure in question is repeated by using different values of initial workload or different workflow volumes to be executed.

Generally speaking, this test procedure provides a positive outcome if:

- when a perturbation is generated (e.g. by turning off one or more remote servers 12), the grid 11 continues to provide a level of service, and
- when the initial operation conditions are re-established (e.g. by re-activating those servers 12 that had been previously turned off), the throughput reaches again the initial value it had before the perturbation had been applied on the application.

Adaptability

This involves a set of verifications executed on the distributed-component application whose purpose is to control those functionalities that permit execution of workflows with different priorities, depending on the business levels/targets set thereon. These functionalities are particularly useful when the application is subject to situations of scarcity of hardware resources (for instance in terms of CPU or memory resources). Under these circumstances, the application must apply "decision" rules in order to establish what workflows are to be executed first and what workflows have to be queued.

The test procedure associated with this kind of verification uses again "dummy" workflows of the same type in respect of which different business targets are applied or having different execution priorities.

In general terms, the test procedure associated with this verification is comprised of three phases or steps:

- a first step wherein the distributed-component application is gradually loaded until the maximum throughput is reached by resorting to workflows to which low priority rules are applied or having less stringent business targets;
- a second phase where, once the maximum throughput is reached, the distributed-component application is further loaded with the high-priority workloads; and
- a third phase were the capacity of the distributed-component application is tested concerning the capability of activating its adaptive functionalities, namely the capability of executing first the higher priority workflows and then the workflows having lower priorities.

Preferably, the following checks are made in detail:

- whether the application is capable of complying with all the business targets applied on the workflows, namely capable of finding a throughput combination for all the workflows such as to guarantee that the business targets set are complied with both for low priority workflows and for high-priority workflows, and
- whether block phenomena occur for those workflows having a low priority, namely that the distributed-component application, in attempting to ensure a business level for the high-priority workflows, no longer executes any low-priority workflow.

Adaptability in the Presence of External Perturbations

This involves a set of verifications, performed on the distributed-component application, having the purpose of controlling the application functionalities that enable execution of the workflows having different priorities as a function of the business level set thereon. This in the case where the hardware resources of the remote servers 12 over which the application is run are appreciably used by application components that are "external" to the application under test.

In practice, while the adaptability test considered in the foregoing relies on context where only the application under test is run over the remote servers 12, in this specific test a scenario is assumed wherein several applications that contend for the same processing resources are run on the same remote servers.

The test procedure to be implemented in this case is similar to the adaptability test considered in the foregoing. In this case, however, the distributed agents 14 of the testing system apply on the remote servers 12 a variable workload that has the purpose of any emulating the behaviour of the external applications.

In this case, the test procedure associated with this verification includes the following phases or steps:

- a first phase, where the distributed-component application is gradually loaded until the maximum throughput is reached by resorting to workflows to which low-priority rules are applied or having less stringent business targets;
- a second phase, where, once the maximum throughput has been reached, the distributed-component application is further loaded with the high-priority workflows;
- a third phase, where the distributed agents 14 of the test system cause a perturbation workload to be emulated on one or more of the remote servers 12 on which the intelligent components of the applications run. The emulated workload can be for example a script whose execution produces the effect of activating occupation of one or more processing resources of the server (for instance CPU consumption or memory consumption);
- a fourth verification phase, where a check is made as to whether the distributed-component application activates those functions that seek for a throughput combination in executing the workflows having different priorities such as to ensure compliance with the business targets applied thereon.

Without departing from the underlying principles of the invention, the details and embodiments may vary, even significantly, with respect to what has been described and illustrated, by way of example only, without departing from the scope of the invention as defined by the annexed claims.

The invention claimed is:

1. A method of automatically testing performance of applications run on a distributed processing structure comprising a grid of processing units comprising the steps of:

running at least one application on said distributed processing structure;

loading said application with processing workload to thereby produce processing workload on said distributed processing structure;

automatically testing adaptability in the presence of external perturbations or capability of an application to execute workflows when said processing units in said grid are used also by application components external to the application under test;

sensing an operating status of said processing units in said distributed processing structure under said processing workload, wherein the operating status comprises one or more of processor utilization, the number of operations performed as a function of said processing units in said distributed processing structure, and the number of processes running on said processing units;

producing information signals indicative of said operating status;

collecting said information signals; and providing a rule engine and selectively modifying, as a function of the rules in said rule engine and said information signals collected, at least one of:

said processing workload on said application, and the operating status of at least one processing unit in said grid.

2. The method of claim 1, comprising the steps of:

generating an initial processing workload applied to said application;

collecting said information signals indicative of the operating status of the processing units in said grid;

processing said information signals indicative of the operating status of the processing units in said grid; and generating, as a function of said processing of said information signals, a new processing workload; and applying to said application said new processing workload.

3. The method of claim 1, comprising the steps of coupling with the processing units in said grid respective distributed agents to collect said information signals indicative of the operating status of the processing units in said grid.

4. The method of claim 1, comprising the steps of coupling with the processing units in said grid respective distributed agents to selectively modify the operating status of the processing unit coupled therewith.

5. The method of claim 4, comprising the steps of coupling with the processing units in said grid respective distributed agents to selectively turn on and off the processing unit coupled therewith.

6. The method of claim 1, comprising the step of providing a graphic environment by means of which a user can select and/or define test procedures to be executed on applications under test.

7. The method of claim 1, comprising the step of providing a policy controller module to selectively supervise execution of test procedures on applications under test.

8. The method of claim 7, comprising the step of associating with said policy controller module a policy library having stored therein test policies to be run, each said policy comprising a sequence of commands and loads to be applied to applications under test.

9. The method of claim 1, comprising the step of providing a loader manager module to execute test procedures on applications under test.

10. The method of claim 9, comprising the steps of:
providing a policy controller module, said policy controller module issuing sequences of commands and loads to be applied to applications under test, and
said loader manager module executing said sequence of commands and loads as received by said policy controller module.

11. The method of claim 9, comprising the step of said loader manager module generating application loads in the form of workloads toward the applications under test.

12. The method of claim 9, comprising the steps of:
coupling with the processing units in said grid respective distributed agents to collect said information signals indicative of the operating status of the processing units in said grid; and
said loader manager module collecting said information signals indicative of said operating status via said respective distributed agents.

13. The method of claim 9, comprising the steps of:
coupling with the processing units in said grid respective distributed agents to selectively modify the operating status of the processing unit coupled therewith; and
said loader manager module specifying actions to be performed by said respective distributed agents on the processing units to which they are associated to selectively modify the operating status thereof.

14. The method of claim 9, comprising the step of said loader manager module establishing said processing workload on said application in a dynamic way until a final operating condition is reached for an application under test.

15. The method of claim 1, comprising the step of storing in a database the information conveyed by said information signals indicative of the operating status of the processing units in said grid.

16. The method of claim 1, comprising said automatically testing performance of applications run on said distributed processing structure comprising a grid of processing units comprises testing at least one of:
an application scalability or capability of an application to ensure an increase in throughput with an increase of number of the processing units in said grid;
a degree of parallelism or capacity of an application to parallelise execution of activities to be performed;
a throughput sensitivity or capacity of an application to ensure a given throughput level in the presence of application loads of different types;
a presence of bottlenecks or presence of application components likely to singularly affect performance of an entire application in terms of maximum throughput to be achieved;
an absence of domino effects or capability of an application to ensure availability of its functionalities irrespective of unavailability of any of said processing units in said grid;
stability or capacity of an application to operate in a stable manner;
stress or the capacity of an application to support a peak in processing load;
adaptability or capability of an application to process with different priorities workflows of different types in order to ensure given business targets;
adaptability in the presence of external perturbations or capability of an application to execute workflows with different priorities depending on business levels associated therewith when said processing units in said grid are used also by application components external to the application under test;
workflow distribution policies or capability of an application to govern distribution of workflows over said processing units in said grid; and
resource occupation policies or capacity of an application to ensure that hardware resources on said processing units in said grid are occupied in compliance with predefined rules.

17. A system for automatically testing performance of applications run on a distributed processing structure comprising a grid of processing units, the system being capable of performing the method of claim 1.

18. A computer program product, loadable into the memory of at least one computer and comprising software code portions capable of performing the method of claim 1.

* * * * *